(12) United States Patent
Sumada et al.

(10) Patent No.: US 6,428,076 B2
(45) Date of Patent: Aug. 6, 2002

(54) REMOTE CONTROL TYPE VEHICULAR TRUNK

(75) Inventors: Takashi Sumada; Yoshifumi Mochizuki; Koji Kano; Koichi Nozoe; Tsuguhito Ichiriki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,995

(22) Filed: Mar. 30, 2001

(30) Foreign Application Priority Data

Mar. 31, 2000 (JP) ........................................ 2000-098984

(51) Int. Cl.⁷ .............................................. B60R 11/06
(52) U.S. Cl. ........................ 296/37.1; 296/37.6; 296/76; 70/264

(58) Field of Search ............................. 296/37.1, 37.13, 296/76, 97.22, 37.6; 70/264, 256, 263; 340/5.26, 5.28, 426; 224/413; 180/267

(56) References Cited

FOREIGN PATENT DOCUMENTS

JP          A5938472         3/1984

*Primary Examiner*—K B Patel
(74) *Attorney, Agent, or Firm*—Birch, Stewart, Kolasch & Birch, LLP (57) ABSTRACT

A remote control type vehicular trunk is provided which includes a plurality of trunks each having a lid whereby the lids are locked and unlocked by a remote controller. The trunks have a pop-up device, which opens at least one of the lids in response to a predetermined remote control. The controller includes a first actuator for locking or unlocking each of the lids, and a second actuator for unlocking the at least one of the trunks provided with the pop-up device and actuating the pop-up device.

14 Claims, 9 Drawing Sheets

S10: Is radio signal transmitted?
S11: Unlocking signal?
S12: Unlocking command is issued to key actuator
S13: Has any one of trunks been opened?
S14: Has predetermined time elapsed?
S15: Locking command is issued to key actuator
S16: Pop-up signal?
S17: Pop-up command is issued to key actuator
S18: Pop-up command is issued to pop-up actuator
S19: Locking signal?
S20: Is any one of trunks left open?
S21: Locking command is issued to key actuator
S22: Hazard lamp is turned on and off ten times to warn

REMOTE CONTROL TYPE VEHICULAR TRUNK

BACKGROUND OF THE INVENTION

1. Field of the Invention

The present invention relates to a remote control type vehicular trunk capable of being locked and unlocked by a radio type remote control and particularly to a remote control type vehicular trunk, which comprises a plurality of trunks including a trunk capable of opening its lid simultaneously while being unlocked.

2. Background Art

In such saddle type vehicles as two-wheeled motor vehicles, aquatic motorbikes, and snowmobiles, the provision of plural trunks is effective for improving the storage capacity. In Japanese Utility Model Publication No. Hei 3-3114 filed by the applicant in the present case, there is proposed a two-wheeled motor vehicle wherein a rear trunk is mounted behind a seat and a pair of side trunks are mounted on right and left sides of a rear portion of the vehicle. Further, in Japanese Patent Laid-open No. Sho 59-38472, there is disclosed a technique for locking and unlocking a trunk of a four-wheeled motor vehicle by remote control.

Even if a trunk can be unlocked by a remote operation, it is impossible to accommodate goods therein, and for accommodating goods therein it is necessary to open a lid of the trunk. Therefore, in the case where a person who wants to put goods into the trunk holds the goods in both hands or where the person wears gloves, it is desirable that not only unlocking but also opening the lid, i.e., pop-up, after unlocking be capable of being performed by remote control.

On the other hand, if plural trunks are mounted on a saddle type vehicle such as a two-wheeled motor vehicle, it is possible to use the trunks properly according to purposes of use. For example, goods that are taken in and out frequently and goods that are not so often taken in and out can be accommodated in different trunks.

However, if all the trunks are unlocked and popped up simultaneously by a single remote control, a lid closing operation comes to be required as an additional operation for a trunk that is not required to be popped up. Further, if a trunk whose lid opens sideways is opened in a rainy condition, rain will get into the trunk. Therefore, it is desirable that only a trunk of a high goods taking-in and -out frequency or a trunk whose lid opens upward and which is thus not likely to permit entry of rainwater even upon opening of the lid in a rainy condition, be popped up after unlocking.

It is an object of the present invention to solve the above-mentioned problems of the prior art and provide a remote control type vehicular trunk comprising plural trunks capable of being locked and unlocked by remote control, in which is included a trunk capable of being popped up after unlocking by remote control.

SUMMARY OF THE INVENTION

According to the present invention, for achieving the above-mentioned object, there is provided a remote control type vehicular trunk comprising a plurality of trunks each having a lid, the lid being locked and unlocked by remote control using a remote controller, characterized in that at least one of the plural trunks has pop-up means which opens the lid in response to a predetermined remote control, and the remote controller includes a first actuator for locking or unlocking the lids of all the trunks and a second actuator for unlocking the trunk provided with the pop-up means and for actuating the pop-up means.

According to the above characteristic of the invention, the trunk is provided with a pop-up means, whereby not only locking and unlocking can be done remotely by operation of the first actuator of the remote controller, but also unlocking and pop-up can be done remotely by operation of the second actuator of the remote controller.

Further, according to the present invention, there is provided when all the trunks are unlocked by the remote control, if the period of time during which the trunks are opened exceeds a predetermined time, the trunks locks automatically. Therefore, even in the event the rider advertently unlocks the trunk by operating the remote controller, there is no fear of the trunk being left unlocked.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
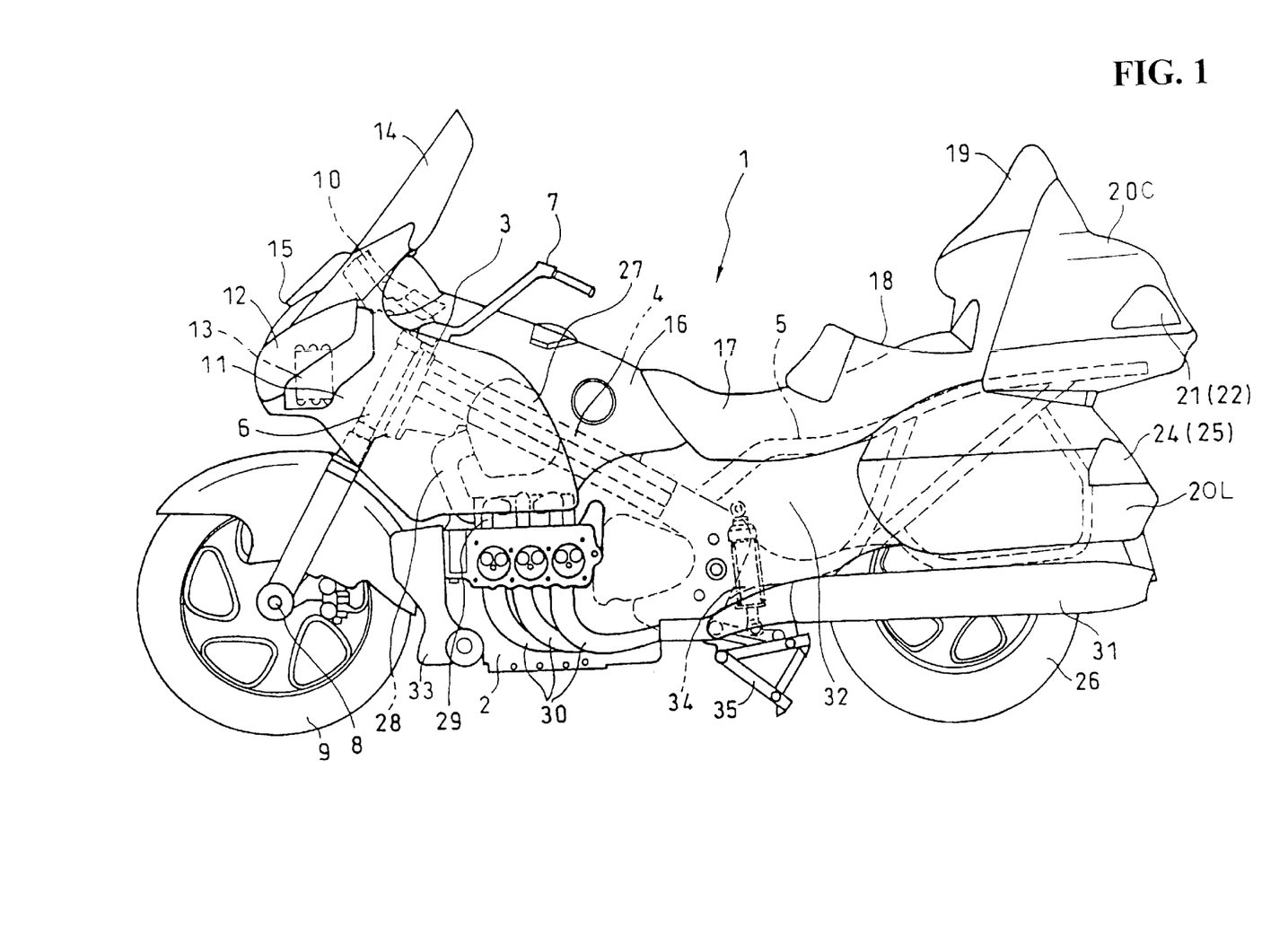
FIG. 1 is a side view of a two-wheeled motor vehicle with a remote control type vehicular trunk according to the present invention mounted thereon.

The present invention will be described in detail hereinunder with reference to the drawings. FIG. 1 is a side view of a two-wheeled motor vehicle on which a remote control type vehicular trunk embodying the invention is mounted.

A two-wheeled motor vehicle (hereinafter referred to as the "vehicle") 1 carries a six-cylinder engine 2 horizontally and a frame structure thereof is composed of a twin frame type main frame 4 extending in a bifurcated form backward of the vehicle from a steering head 3 and rear frames 5 connected to and extending backward from the main frame 4. In the steering head 3 is mounted a front fork 6 so as to be rotatable in steering directions, the front fork 6 comprising two pipes disposed right and left in a vehicular running direction. A bar handle 7 is fixed to the top of the front fork 6, that is, to a top bridge. A front axle 8 is secured to a lower end of the front fork 6 and a front wheel 9 is supported rotatably on the front axle 8.

A meter unit 10 is provided in front of the bar handle 7 and a lens surface (clear lens) 12 of a lamp device is mounted in front of a front fairing (cowl) 11 which covers a front portion of the vehicle 1. Inside the front cowl 11 accommodates a voltage increasing device (ballast) 13 of an electric discharge lamp which is used as a lamp device. A windscreen 14 is mounted above the front cowl 11 and an air inlet 15 is formed near the mounted portion of the windscreen 14.

A fuel tank 16 is mounted on the main frame 4. Behind the fuel tank 16 and on the rear frames 5 are mounted a driver seat 17 and a fellow passenger seat 18. The fellow passenger seat 18 is integral with the driver seat 17 and has a back rest 19. Behind the back rest 19 is provided a rear trunk 20C which is locked and unlocked by means of a remote controller to be described later. In a rear portion of the rear trunk 20C are mounted rear stop lamps 21 and blinker lamps 22.

Below the rear trunk 20C and on the left and right sides of a rear wheel 26 are provided side trunks 20L and 20R which are locked and unlocked by means of a remote controller as is the case with the rear trunk 20C. In rear portions of the side trunks 20L and 20R are provided another pair of rear stop lamps 24 and another pair of blinker lamps 25.

An air cleaner 27 is mounted below and in front of the fuel tank 16 and a throttle body 28 is mounted in front of the air cleaner 27, with intake manifolds 29 extending from the throttle body 28. The three engine cylinders are disposed on the right and left sides of the vehicle body, and the three intake manifolds 29 are connected to the three cylinders. Upstream of each of the cylinders is disposed a fuel injector (not shown). Exhaust manifolds 30 are drawn out backward from the engine 2 and are connected to mufflers 31.

Both right and left sides below the driver seat 17 are covered with side covers 32 and a front lower cowl 33 is disposed in front of the engine 2. A rear cushion 34 is provided below the driver seat 17. The rear cushion 34 is connected to a hydraulic unit (not shown) which can adjust the spring force electrically and which thereby can adjust an initial suspension load in accordance with the weight of the driver. The vehicle 1 can be allowed to stand up with use of a stand 35.

Figure 2:
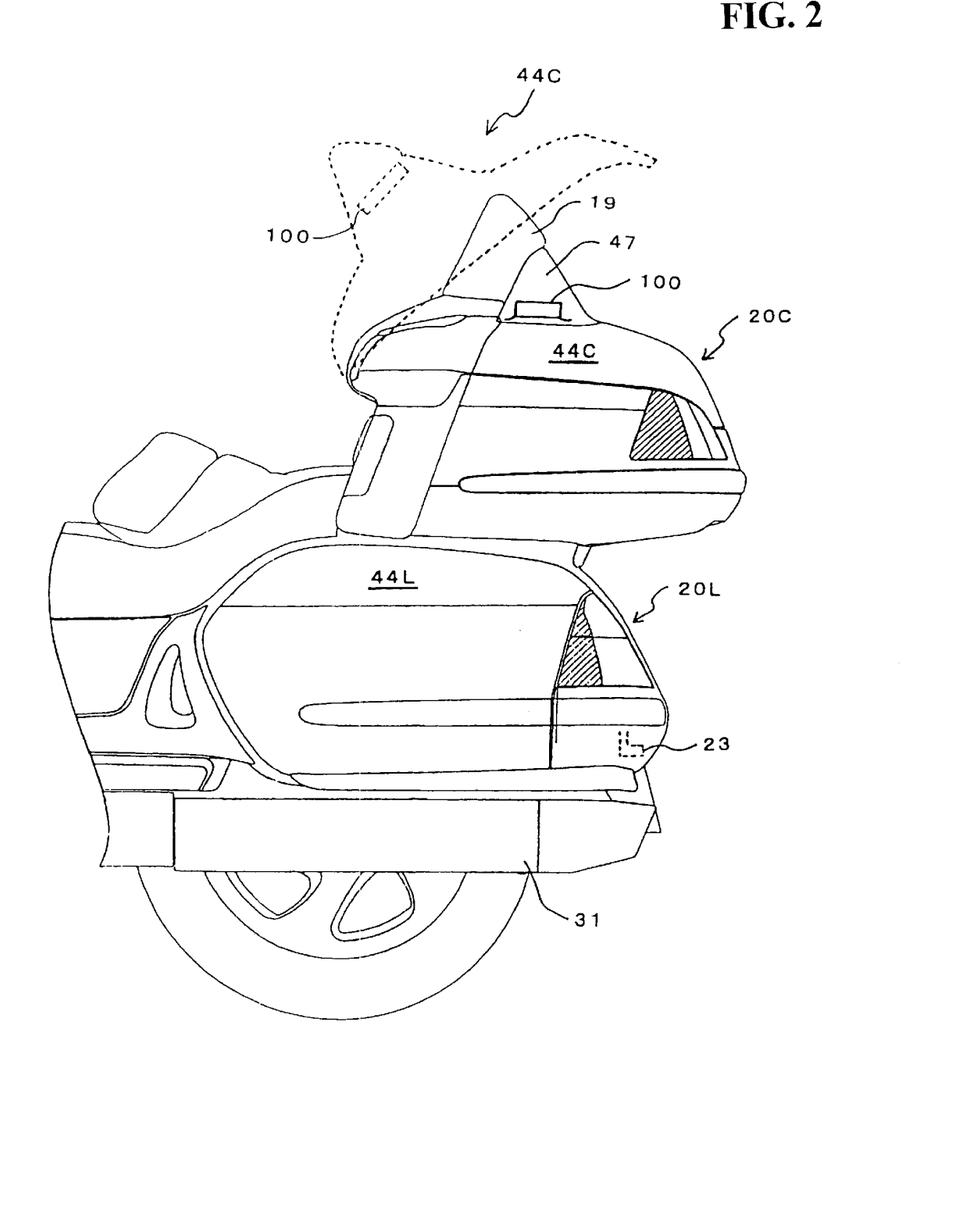
FIG. 2 is a detailed side view of a rear portion of the vehicle shown in FIG. 1.
Figure 3:
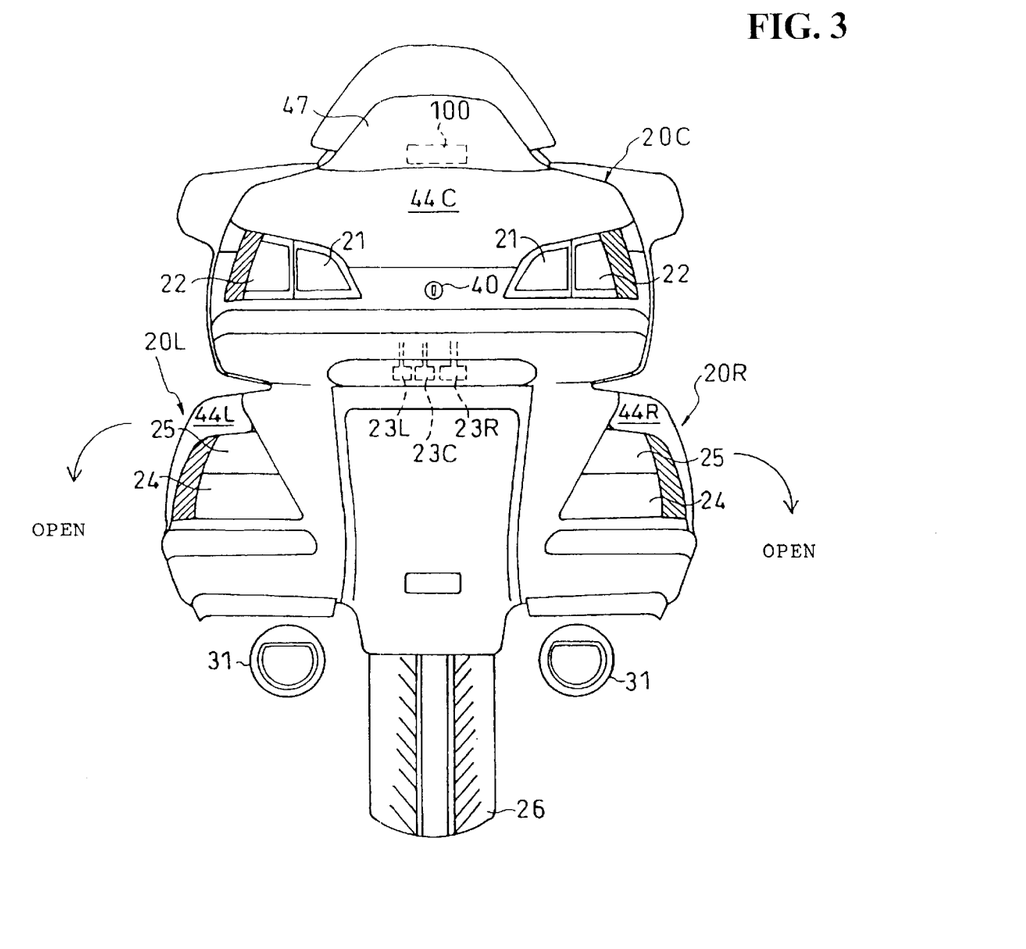
FIG. 3 is a rear view of the vehicle shown in FIG. 1.
Figure 4:
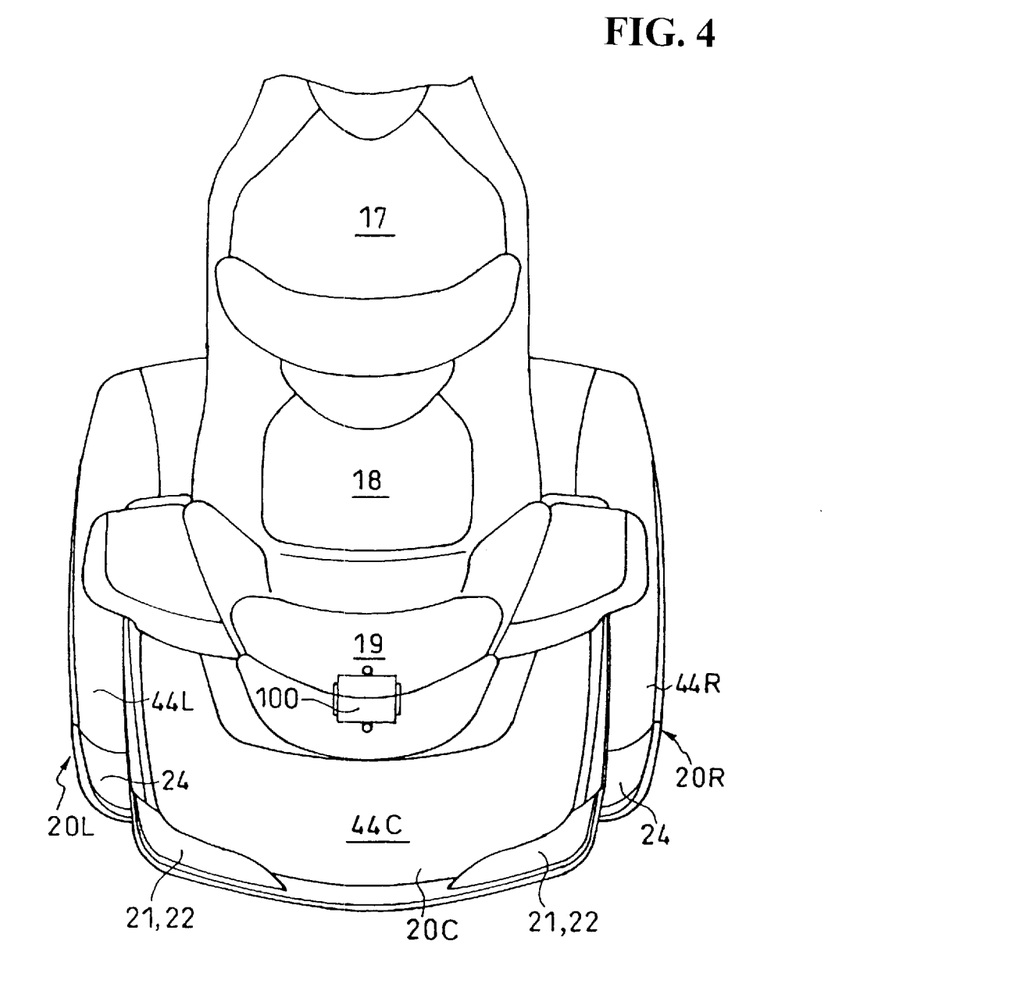
FIG. 4 is a diagram of the rear portion of the vehicle shown in FIG. 1 as seen from above.

FIG. 2 is a detailed side view of a rear portion of the vehicle 1 and the vicinity thereof, FIG. 3 is a rear view of the vehicle 1, and FIG. 4 is a view of the vehicle rear portion as seen from above. In these figure, the same reference numerals as in FIG. 1 represent the same or equivalent portions.

In the vehicle 1, as shown in FIG. 2, a lid of the trunk 20C can open upward, while lids 44L and 44R of the side trunks 20L and 20R can open sideways. The trunks 20C, 20L, and 20R are locked and unlocked by inserting an engine key into a key cylinder 40 (see FIG. 3) provided in the trunk 20C and by turning the engine key. In this embodiment, locking and unlocking of the trunks 20C, 20L, and 20R can also be done by a radio type remote controller. A controller 100 having incorporated therein a radio signal receiving function, as well as an actuator for locking and unlocking and a sensor, are mounted on the vehicle.

It is preferable that the controller 100 be received in a dead space on the vehicle. But if the controller 100 is spaced away from the trunks, the length of wiring connected with an actuator of each trunk becomes larger and the wiring is exposed to the exterior of the vehicle, thus resulting in impairment of appearance.

In case of utilizing an infrared ray in the above radio communication, it is necessary to take care so that there is no obstacle between a remote controller and the controller 100 no matter which position the remote controller may be operated at. It is preferable that the controller 100 be positioned at a high position of good visibility. In case of utilizing a radio wave in the radio communication, it is desirable to position the controller 100 away from the engine in order to prevent the controller from being influenced by noise generated from the engine.

Where the rear trunk 20C mounted behind the fellow passenger seat 18 is relatively large-sized as in the vehicle of this embodiment, the rear trunk is formed high so that its front face serves also as the back rest 19 for a fellow passenger, as shown in FIG. 2.

In this case, from the standpoint of aerodynamics and design, a projection 47 having a projected upper surface is formed on top of the rear trunk 20C, that is, on the lid 44C. Consequently, a space of a low utility value, i.e., dead space, is formed in the interior of the rear trunk 20C and inside the projection 47. This space is located at a high position of good visibility and is spaced away from the engine 2.

In this embodiment, the controller 100 is disposed inside the projection 47 which is formed on top of the rear trunk 20C, more particularly, on the lid 44C.

As shown in FIG. 3, three opening/closing levers 23L, 23C, and 23R are provided in a lower portion of the rear trunk 20C. The lids 44L, 44C, and 44R of the side trunk 20L, rear trunk 20C, and side trunk 20R, respectively, are opened by operating the levers 23L, 23C, and 23R after unlocking made by the foregoing key operation or remote control.

In this embodiment, particularly as to the rear trunk 20C, as will be described in detail below, the lid 44C can be allowed to pop up simultaneously with unlocking even by the key operation or remote control without operating the opening/closing lever 23C.

Figure 5:
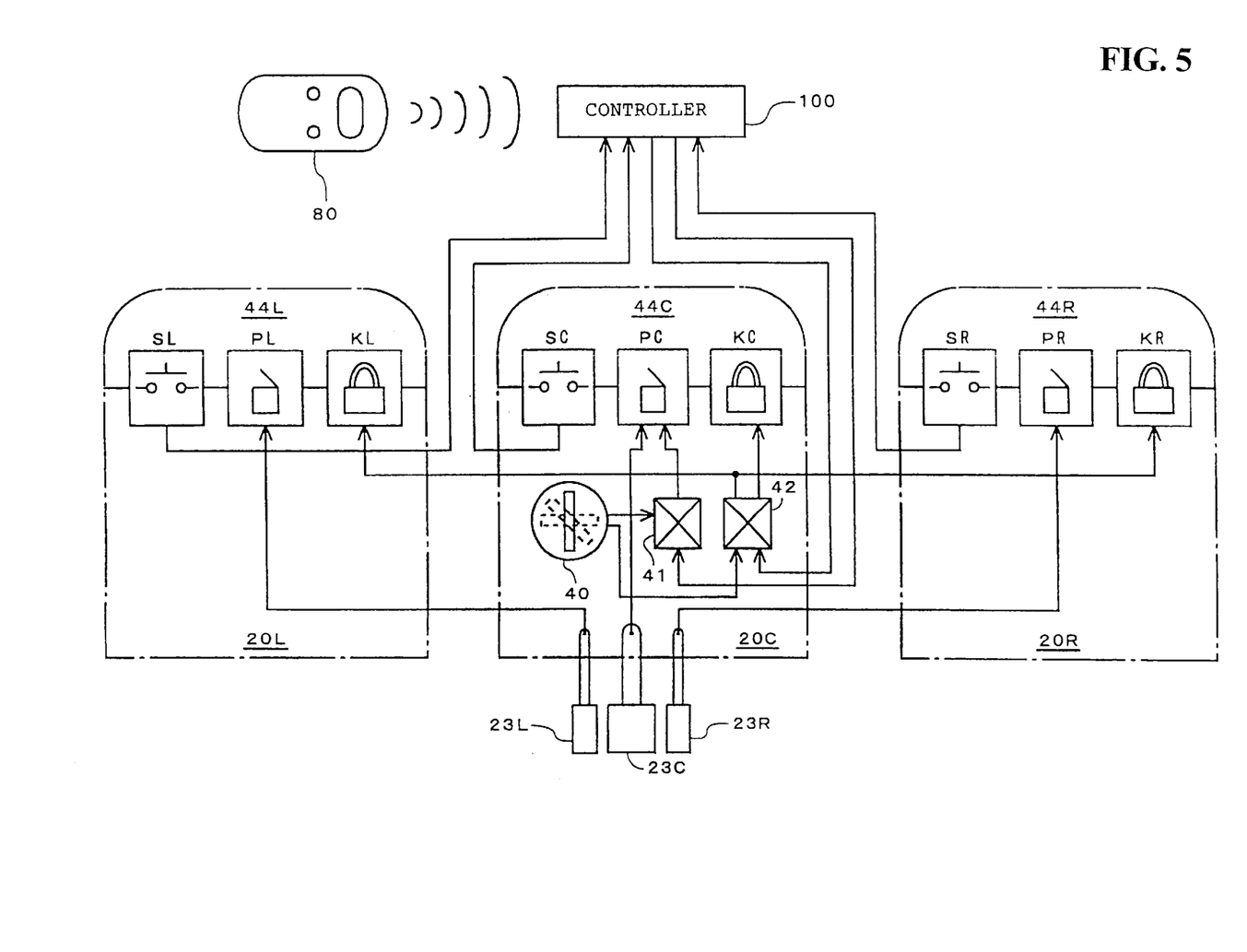
FIG. 5 is a functional block diagram of remote control type vehicular trunks.

FIG. 5 is a functional block diagram schematically showing the configuration of a system, which locks, unlocks and pops up the lid 44 of each trunk 20 by remote radio operation using a remote controller 80, in which the same reference numerals as above represent the same or equivalent portions.

In the rear trunk 20C, a switch SC detects whether the lid 44C is open or closed and outputs the result of the detection to the controller 100. A lock mechanism KC is actuated by a key actuator 42 to lock or unlock the lid 44C. A trunk catcher PC is actuated by a pop-up actuator 41 to pop up the lid 44C simultaneously with unlocking. Further, only at the time of unlocking the trunk catcher PC is actuated by operation of the opening/closing lever 23C and opens the lid 44C. A key cylinder 40 locks or unlocks each trunk in response to a key operation and causes the lid 44C to pop up simultaneously with unlocking.

In the left and right side trunks 20L, 20R, switches SL and SR detect respectively whether the lids 44L and 44R are open or closed, and output the results of the detection to the controller 100. Lock mechanisms KL and KR are actuated by the key actuator 42 to lock the lids 44L and 44R respectively. Trunk catchers PL and PR are actuated by the opening/closing levers 23L and 23R to open the lids 44L and 44R.

The controller 100 detects a radio signal transmitted from the remote controller 80, and in response to signals transmitted from the switches S it controls the pop-up actuator 41 and the key actuator 42.

Figure 6:
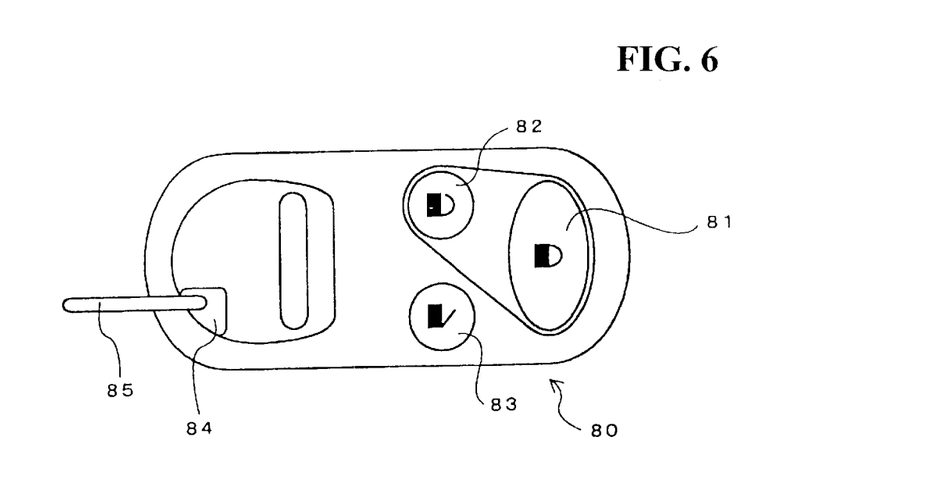
FIG. 6 is a plan view of a remote controller.
Figure 7:
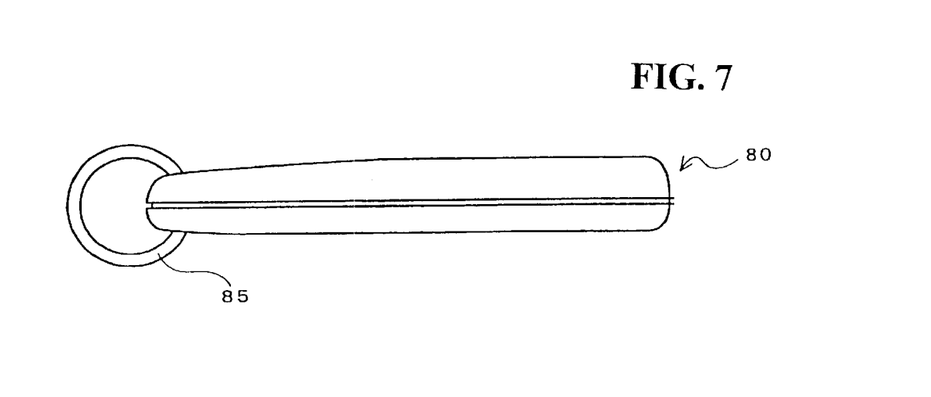
FIG. 7 is a side view of the remote controller.

FIG. 6 is a plan view of the remote controller 80 and FIG. 7 is a side view thereof. The remote controller 80 used in this embodiment is provided with a locking button 81 for locking all the trunks, an unlocking button 82 for unlocking all the trunks, and a pop-up button 83 for unlocking and popping-up only the rear trunk 20C selectively. An accessory ring 85 is fitted in a through hole 84 formed in an end portion of the remote controller 80.

When the locking button 81 is pushed, the remote controller 80 transmits a locking signal, while when the unlocking button 82 is pushed, the remote controller transmits an unlocking signal. Further, when the pop-up button 83 is pushed, the remote controller 80 transmits a pop-up signal.

Figure 8:
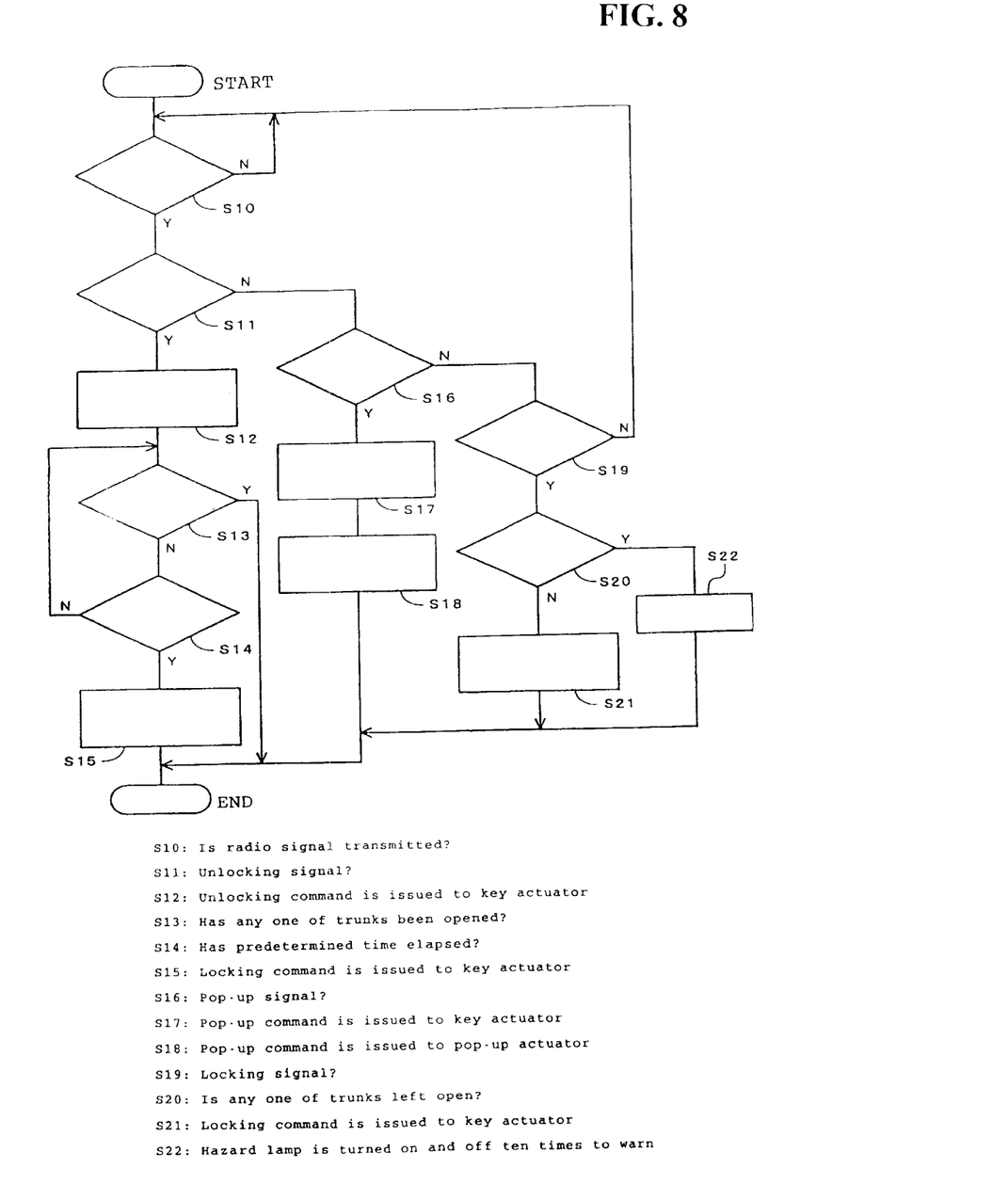
FIG. 8 is a flow chart showing operations of this embodiment.

Next, the operation of the controller 100 will be described below with reference to a flow chart of FIG. 8.

In step S10, a check is made to see whether a radio signal transmitted from the remote controller 80 has been received or not. If the answer is affirmative, the processing flow advances to step S11, in which it is judged whether the received signal is an unlocking signal or not. If the answer is affirmative, the flow advances to step S12, in which an unlocking command is issued from the controller 100 to the key actuator 42. Then, in response to the unlocking command the key actuator 42 unlocks all the lock mechanisms KC, KR, and KL.

In step S13, it is determined whether any lid 44 of the trunks has been opened or not, in accordance with output signals provided from the switches SC, SR, and SL mounted in the trunks. In step S14, a judgment is made as to whether the time during which none of the trunks 44 are opened exceeded a predetermined time or not. If the answer is affirmative, the flow advances to step S15, in which a locking command is issued from the controller 100 to the key actuator 42. In response to the locking command the key actuator 42 locks all the lock mechanisms KC, KR, and KL.

Thus, in this embodiment, even if all the trunks are unlocked in response to the unlocking command, if the time during which none of the trunks are opened exceeds a predetermined time, the trunks are locked automatically. Therefore, even in the event the trunks should be unlocked by an erroneous operation of the remote controller made by the driver, there is no fear of the trunks being left unlocked.

On the other hand, if it is judged in step S11 that the received signal is a signal other than unlocking signal, the flow shifts to step S16, in which a judgment is made as to whether the received signal is a pop-up signal or not. If the answer is affirmative, the flow advances to step S17, in which a pop-up command is issued from the controller 100 to the key actuator 42. In response to the pop-up command the key actuator 42 causes only the lock mechanism KC to be unlocked selectively.

Then, in step S18, a pop-up command is issued from the controller 100 to the pop-up actuator 41, which in turn actuates the pop-up mechanism PC of the trunk 20C in response to the pop-up command. As a result, the lid 44C of the trunk 20C is popped up by the pop-up mechanism PC.

Thus, in this embodiment, since unlocking and pop-up of the rear trunk 20C can be done by a single operation of the remote controller, so even when the driver carries goods in both hands or wears gloves, he or she can perform taking in and out of goods in a simple manner. Besides, since it is only the lid 44C of the rear trunk 20C that is popped up, it is not necessary to close again the lids 44L and 44R of the side trunks.

In this embodiment, moreover, since the above pop-up function is given to only the rear trunk 20C whose lid opens upward, the entry of rainwater can substantially be prevented even when the lid is opened by remote control in a rainy condition.

On the other hand, if it is judged in step S16 that the received signal is a signal other than pop-up signal, the flow shifts to step S19, in which a check is made to see whether the received signal is a locking signal or not. If the answer is affirmative, the flow advances to step S20, in which a judgment is made as to whether any lid 44 of the trunks is left open or not. If all the lids 44 are closed, then in step S21 a locking command is issued from the controller 100 to the key actuator 42, which in turn locks all the lock mechanisms KC, KR, and KL in response to the locking command. If any lid 44 is left open, the flow shifts to step S22, in which, for example a hazard lamp is turned on and off ten times or so to warn the driver.

In this embodiment, when the engine key inserted into the key cylinder 40 is turned 90° clockwise, an unlocking command is issued from the key cylinder 40 to the key actuator 42, which in turn unlocks all the lock mechanisms KC, KR, and KL.

When the engine key is turned 90° back from the unlocking position, a locking command is issued from the key cylinder 40 to the key actuator 42, which in turn locks all the lock mechanisms KC, KR, and KL in response to the locking command.

Further, when the engine key is turned counterclockwise from this lock position, a pop-up command is issued from the key cylinder 40 to both key actuator 42 and pop-up actuator 41. In response to this pop-up command the key actuator 42 unlocks only the lock mechanism KC in the trunk 20C selectively.

The pop-up actuator 41 actuates the pop-up mechanism PC of the trunk 20C in response to the pop-up command, causing the lid 44C to pop up.

Figure 9:
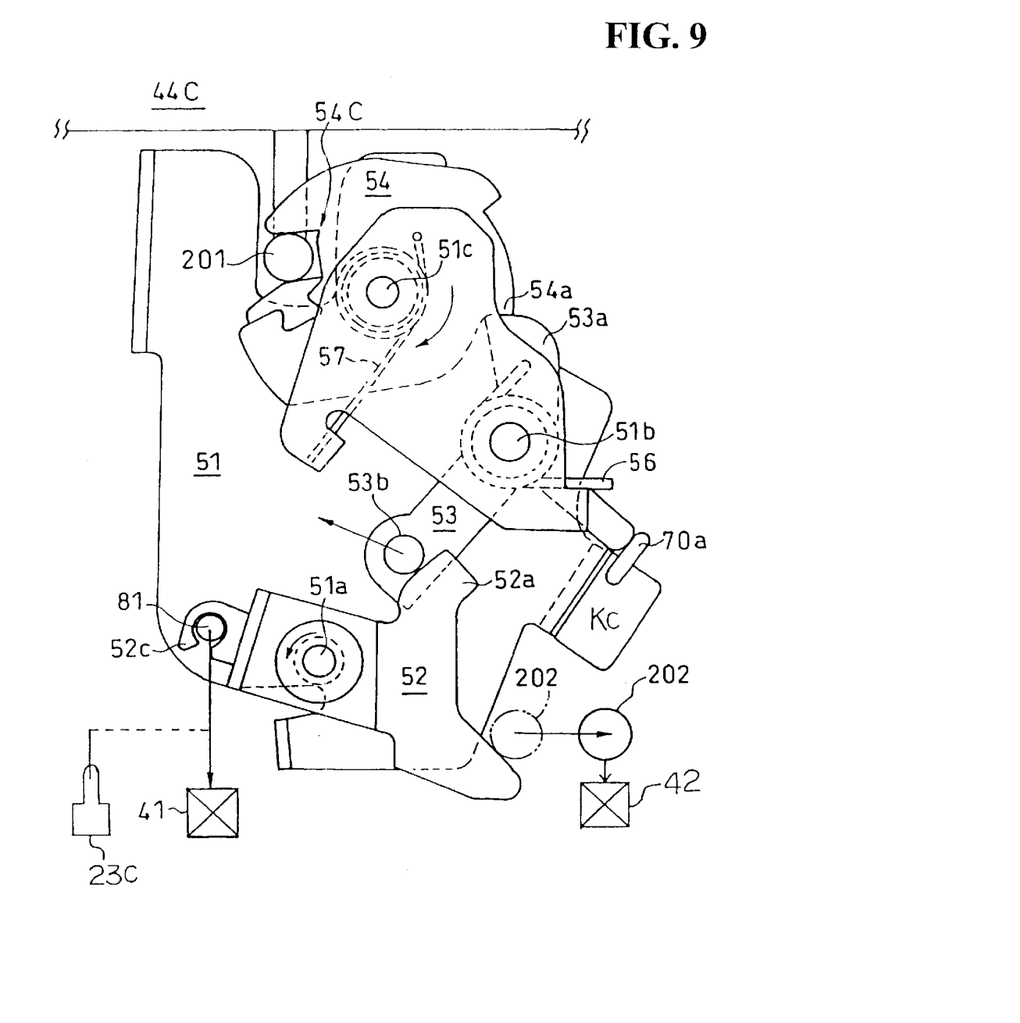
FIG. 9 illustrates a configuration of a trunk catcher (before pop-up state)
Figure 10:
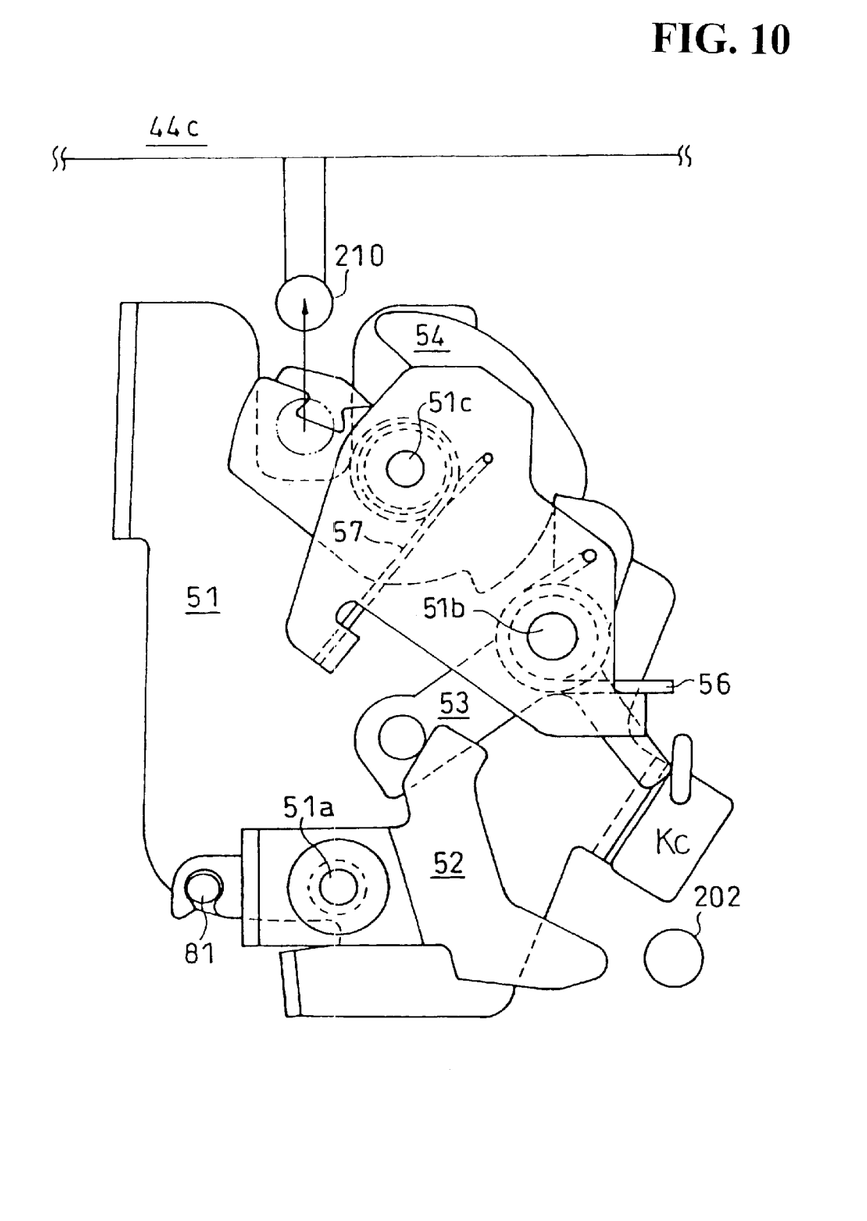
FIG. 10 illustrates a configuration of the trunk catcher (pop-up state).

FIGS. 9 and 10 illustrate a configuration of principal portions of the trunk catcher P mounted in each trunk for realizing the pop-up function, of which FIG. 9 illustrates a state before pop-up and FIG. 10 illustrates a pop-up state. Here, with the trunk catcher PC mounted in the rear trunk 20C as an example, its configuration and operation will be described.

Support shafts 51a, 51b, and 51c are erected on a base plate 51, and first, second, and third cam plates 52, 53, 54 are supported rotatably on the support shafts 51a, 51b, and 51c, respectively. The second cam plate 53 is constantly urged counterclockwise with the biasing force of a spring 56. The third cam plate 54 is constantly urged clockwise with the biasing force of a spring 57. On the basis of a rotational position of the second cam plate 53 the switch SC detects whether the lid 44C is open or closed.

According to such a configuration, in the state before pop-up illustrated in FIG. 9, an opening/closing pin 201 for the trunk lid 44C is positioned within a bifurcated portion 54c of the third cam plate 54. In the third cam plate 54, with the bifurcated portion 54c kept open leftward, a stopper arm 53a of the second cam plate 53 is engaged with a step 54a formed on an outer periphery of the third cam plate 54 to prevent the clockwise rotation of the third cam plate. Therefore, the opening/closing pin 201 is locked by the bifurcated portion 54c, whereby the lid 44C is kept closed.

A lock pin 202 as the lock mechanism KC is adapted to shift in the right and left directions in FIG. 9 in interlock with the key actuator 42. In a locked state the lock pin 202 assumes the position indicated with a broken line, while in an unlocked state it is moved up to the position indicated with a solid line. A pop-up rod 81 is engaged with a fulcrum portion 52c of the first cam plate 52. The pop-up rod 81 is adapted to shift vertically in the figure in interlock with both pop-up actuator 41 and opening/closing lever 23C.

When the opening/closing lever 23C is operated by the driver or the pop-up actuator 41 is operated by remote control using the remote controller 80, the pop-up rod 81 undergoes a downward force in the figure. At this time, if the lock pin 202 is in its unlock position indicated with a solid line, the first cam plate 52 turns counterclockwise about the support shaft 51a. On the other hand, if the lock pin 202 is in its lock position indicated with a broken line, the rotation of the first cam plate 52 is inhibited by the lock pin 202.

When the first cam plate 52 is turned counterclockwise, the pin 53b erected in the pivot point of the second cam plate 53 is pushed and shifted in the direction of an arrow by an operating portion 52a of the first cam plate 52. As a result, the second cam plate 53 turns clockwise about the support shaft 51b against the biasing force of the spring 56.

When the second cam plate 53 is turned, a contact lever 70a of the switch SC shifts and causes a contact thereof to be opened or closed. Further, the stopper arm 53a of the second cam plate 53 and the step 54a of the third cam plate 54 are disengaged from each other, so that the third cam plate 54 turns clockwise under the biasing force of the spring 57. As shown in FIG. 10, since the third cam plate 54 is turned until its bifurcated portion 54c faces upward, the pin 201 is released from the bifurcated portion 54c and the lid 44C is popped up.

In the case of-trunk catchers PL and PR mounted in the side trunks 20L and 20R, their pop-up rods 81 are merely displaced by the opening/closing levers 23L and 23R, respectively, and are not connected to the pop-up actuator 41. In this embodiment, therefore, lids other than the lid 44C of the rear trunk 20C cannot be popped up by remote control using the remote controller 80 or by key operation.

According to the present invention there are attained the following effects:

As to the trunk provided with the pop-up means, not only the unlocking and locking operations by the first actuator of the remote controller but also the unlocking and pop-up operations by the second actuator can be done by remote control.

Since the pop-up means is provided in the rear trunk whose lid opens upward, it is possible to substantially prevent the entry of rainwater even when the lid is opened by remote control in a rainy condition.

Even when all the trunks are unlocked by remote control, if the period of time during which the trunks are opened exceeds a predetermined time, the trunks locks automatically. Therefore, even in the event the rider advertently unlocks the trunk by operating the remote controller, there is no fear of the trunk being left unlocked.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remotely controllable vehicular trunk, comprising:
   a plurality of trunks, each having a lid, each of said lids being lockable;
   at least one of said plurality of trunks including a pop-up device for opening a corresponding lid;
   a controller;
   a remote control unit for remotely sending control signals to said controller;
   each of said trunks having a switch indicating whether the corresponding lid is open or closed, each of said switches being connected to said controller;
   a first actuator, connected to said controller for locking and unlocking each of said lids;
   a second actuator connected to said controller for actuating a pop-up device in one of said plurality of trunks;
   a plurality of opening/closing levers with each opening/closing lever being connected to one of said lids for actuating a pop-up device;
   a locking device connected to said first actuator and said second actuator;
   said first actuator being controlled by both said locking device and said remote control unit to lock and unlock said lids simultaneously, said second actuator actuating a pop-up device on one of said lids, said opening/closing levers each actuating a pop-up device on one of said lids.

2. The trunk according to claim 1, wherein said plurality of trunks comprises a rear trunk and a pair of side trunks.

3. The trunk according to claim 2, wherein said lid of said rear trunk opens upwards and said lids of said pair of side trunks open sideways.

4. The trunk according to claim 2, wherein said controller is located in said rear trunk.

5. The trunk according to claim 2, wherein said second actuator is a pop-up actuator located in said rear trunk so that only said lid of said rear trunk pops up while simultaneously being unlocked.

6. The trunk according to claim 1, wherein said pop-up device further comprises a trunk catcher, said trunk catcher being actuated by operation of at least one opening/closing lever.

7. The trunk according to claim 6, wherein said at least one opening/closing lever is provided in a lower portion of a rear one of said plurality of trunks.

8. The trunk according to claim 6, wherein said lids of said plurality of trunks are popped up by operating said at least one of said opening/closing levers.

9. The trunk according to claim 6, wherein said trunk catcher further comprises:
   first, second and third support shafts erected on a base plate; and
   first, second and third cam plates rotatably supported on said first, second and third support shafts, respectively.

10. The trunk according to claim 9, wherein said second cam plate is constantly urged counterclockwise with a biasing force of a first spring.

11. The trunk according to claim 10, wherein said third cam plate is constantly urged clockwise with a biasing force of a second spring.

12. The trunk according to claim 11, wherein a switch detects if said lid is opened or closed based on a rotational position of said second cam plate.

13. The trunk according to claim 1, said locking device including a key cylinder for inserting a key, said key cylinder locking and unlocking said plurality of trunks by turning said key.

14. The trunk according to claim 13, wherein said lids of said plurality of trunks are simultaneously unlocked by the key cylinder or said remote control unit.

* * * * *